US012776556B2

(12) United States Patent
Zhang et al.

(10) Patent No.: US 12,776,556 B2
(45) Date of Patent: Oct. 27, 2026

(54) PARTITION PLATE AND ELECTROCHEMICAL APPARATUS AND ELECTRONIC APPARATUS INCLUDING SUCH PARTITION PLATE

(71) Applicant: Ningde Amperex Technology Limited, Ningde City (CN)

(72) Inventors: Yibo Zhang, Ningde City (CN); Qiaoshu Hu, Ningde City (CN); Nan Zhang, Ningde City (CN); Kun Yan, Ningde City (CN)

(73) Assignee: NINGDE AMPEREX TECHNOLOGY LIMITED, Ningde City (CN)

( * ) Notice: Subject to any disclaimer, the term of this patent is extended or adjusted under 35 U.S.C. 154(b) by 827 days.

(21) Appl. No.: 18/088,874

(22) Filed: Dec. 27, 2022

(65) Prior Publication Data

US 2023/0125965 A1 Apr. 27, 2023

Related U.S. Application Data

(63) Continuation of application No. PCT/CN2020/099430, filed on Jun. 30, 2020.

(51) Int. Cl.
*H01M 50/593* (2021.01)
*H01M 4/02* (2006.01)
(Continued)

(52) U.S. Cl.
CPC ........... *H01M 50/593* (2021.01); *H01M 4/13* (2013.01); *H01M 10/0585* (2013.01); *H01M 2004/029* (2013.01); *H01M 10/0525* (2013.01)

(58) Field of Classification Search
CPC .. H01M 50/593; H01M 4/13; H01M 10/0585; H01M 10/0525
See application file for complete search history.

(56) References Cited

U.S. PATENT DOCUMENTS 5,254,415 A * 10/1993 Williams ............ H01M 50/119 429/185
6,387,564 B1 5/2002 Yamashita et al.
(Continued)

FOREIGN PATENT DOCUMENTS

CN 1251215 A 4/2000
CN 101409339 A 4/2009
(Continued)

OTHER PUBLICATIONS

WO2019230323A1 machine translation (Year: 2025).*
(Continued)

*Primary Examiner* — Brian R Ohara
*Assistant Examiner* — M. T. Leonard
(74) *Attorney, Agent, or Firm* — WHDA, LLP

(57) ABSTRACT

A partition plate includes a partition substrate, a positive electrode membrane, a negative electrode membrane, and an insulation layer. The positive electrode membrane and the negative electrode membrane are respectively located on two surfaces of the partition substrate. The insulation layer is disposed on the partition substrate and the insulation layer is disposed at a periphery of the positive electrode membrane. A zone surrounded by orthographic projection of an outer edge of the insulation layer on the partition substrate covers orthographic projection of the negative electrode membrane on the partition substrate. This application can improve self-discharge and safety performances of electrochemical apparatuses.

14 Claims, 2 Drawing Sheets

(51) Int. Cl.

| | |
|---|---|
| ***H01M 4/13*** | (2010.01) |
| ***H01M 10/0525*** | (2010.01) |
| ***H01M 10/0585*** | (2010.01) |

(56) References Cited

U.S. PATENT DOCUMENTS

| | | | | |
|---|---|---|---|---|
| 2009/0092898 | A1 | 4/2009 | Han | |
| 2013/0130107 | A1* | 5/2013 | Uchida | H01M 4/64 429/211 |
| 2015/0147629 | A1 | 5/2015 | Kim et al. | |
| 2023/0197926 | A1 | 6/2023 | Lin | |

FOREIGN PATENT DOCUMENTS

| | | | |
|---|---|---|---|
| CN | 104282877 | A | 1/2015 |
| CN | 104904053 | A | 9/2015 |
| CN | 109244475 | A | 1/2019 |
| EP | 3648204 | A1 | 5/2020 |
| JP | 2007-188746 | A | 7/2007 |
| JP | 2010-250978 | A | 11/2010 |
| JP | 2014-013693 | A | 1/2014 |
| JP | 2018-028980 | A | 2/2018 |
| JP | 2018-056435 | A | 4/2018 |
| KR | 101739863 | B1 | 5/2017 |
| WO | 2019/230323 | A1 | 12/2019 |

OTHER PUBLICATIONS

JP2018028980A machine translation (Year: 2025).*

International Search Report dated Apr. 1, 2021, issued in counterpart International Application No. PCT/CN2020/099430.

* cited by examiner

PARTITION PLATE AND ELECTROCHEMICAL APPARATUS AND ELECTRONIC APPARATUS INCLUDING SUCH PARTITION PLATE

CROSS REFERENCE TO RELATED APPLICATIONS

This application is a continuation application of PCT international application: PCT/CN2020/099430 filed on Jun. 30, 2020, the disclosure of which is hereby incorporated by reference in its entirety.

TECHNICAL FIELD

This application relates to the electrochemical field, and specifically, to a partition plate and an electrochemical apparatus and an electronic apparatus including such partition plate.

BACKGROUND

Lithium-ion batteries have characteristics such as large specific energy, high operating voltage, low self-discharge rate, small size, and light weight, and are widely applied in the field of consumer electronics. With rapid development of electric vehicles and portable electronic devices, people are having increasingly high requirements for lithium-ion batteries, for example, requiring lithium-ion batteries to have higher energy density, higher safety, better cycling performance, and the like.

However, as lithium-ion batteries are limited by an inherent electrochemical system, it is normally difficult for a single cell to have an operating voltage higher than 5 V. However, during actual use of lithium-ion batteries, there are many scenarios that require high voltages, for example, applications in electric vehicle (EV) and energy storage system (ESS).

In the prior art, to increase the output voltage of lithium-ion batteries, a plurality of lithium-ion batteries are typically connected in series through external wire conductors. However, in such series connection manner, because of capacity differences between individual lithium-ion batteries, the lithium-ion batteries connected in series have low overall energy density (ED), limiting the application scope of lithium-ion batteries.

SUMMARY

This application is intended to provide a partition plate and an electrochemical apparatus and electronic apparatus including such partition plate, to improve energy density of a lithium-ion battery. Specific technical solutions are as follows:

A first aspect of this application provides a partition plate, including a partition substrate, a positive electrode membrane, a negative electrode membrane, and an insulation layer;

where the positive electrode membrane and the negative electrode membrane are respectively located on two surfaces of the partition substrate;

the insulation layer is disposed on the partition substrate and the insulation layer is disposed at a periphery of the positive electrode membrane; and a zone surrounded by orthographic projection of an outer edge of the insulation layer on the partition substrate covers orthographic projection of the negative electrode membrane on the partition substrate.

In an embodiment of this application, a negative electrode membrane zone is present in a counterpart of a zone corresponding to the positive electrode membrane on an opposite side of the partition substrate; and a negative electrode membrane zone is present in at least a part of a counterpart of a zone corresponding to the insulation layer on the opposite side of the partition substrate.

In an embodiment of this application, a gap is present between the positive electrode membrane zone and the insulation layer zone. That gap can provide buffer space for infiltration of an electrolyte into the electrode and volume change of a positive electrode material during charging/discharging. The gap also provides a passage for infiltration of the electrolyte into the positive electrode membrane from a side part, thereby improving charge and discharge rates.

In an embodiment of this application, an orthographic projection of a geometric center of the positive electrode membrane on the partition substrate coincides with orthographic projection of a geometric center of the negative electrode membrane on the partition substrate, a length in a radiating direction from the geometric center to an outer edge of the positive electrode membrane is L1; and in the same radiating direction, a length from the outer edge of the positive electrode membrane to the outer edge of the insulation layer is D, and a length from the geometric center to an outer edge of the negative electrode membrane is L2, where the following geometric relationships are satisfied:

$$L1<L2 \text{ and } L1+D\geq L2.$$

In an embodiment of this application, the positive electrode membrane and the negative electrode membrane are rectangular, and orthographic projection of a geometric center of the positive electrode membrane on the partition substrate coincides with orthographic projection of a geometric center of the negative electrode membrane on the partition substrate, and the positive electrode membrane, the negative electrode membrane, and the insulation layer satisfy the following geometric relationships:

$$Lx1 < Lx2,\ Ly1 < Ly2,\ \frac{Lx1}{2} + Dx \geq \frac{Lx2}{2},\ \text{and}\ \frac{Ly1}{2} + Dy \geq \frac{Ly2}{2}$$

where Lx1 is a length of the positive electrode membrane, Ly1 is a width of the positive electrode membrane, Lx2 is a length of the negative electrode membrane, Ly2 is a width of the negative electrode membrane, Dx is a width of an extension portion of the insulation layer relative to the positive electrode membrane in a long-side direction of the positive electrode membrane, and Dy is a width of an extension portion of the insulation layer relative to the positive electrode membrane in a short-side direction of the positive electrode membrane.

In an embodiment of this application, the extension portion of the insulation layer in the long-side direction of the positive electrode membrane includes a first portion and a second portion, where the first portion and the second portion have a same width or different widths; and the extension portion of the insulation layer in the short-side direction of the positive electrode membrane includes a third portion and a fourth portion, where the third portion and the fourth portion have a same width or different widths.

In an embodiment of this application, an electrical resistivity of the insulation layer is greater than $10^7$ Ω·m.

In an embodiment of this application, 0 mm≤L1+D−L2≤4.5 mm.

In an embodiment of this application, 0.5 mm≤D≤5 mm.

In an embodiment of this application, the partition plate satisfies at least one of the following characteristics:

(a) an electrical resistivity of the insulation layer is greater than $10^{10}$ Ω·m;

(b) 1 mm≤L1+D−L2≤2.5 mm; or (c) 1.5 mm≤D≤3 mm.

In an embodiment of this application, the partition plate further includes a sealing layer, the sealing layer is located at a periphery of the partition plate, and a distance between the insulation layer and the sealing layer is D3, where 0 mm≤D3≤20 mm.

In an embodiment of this application, 2 mm≤D3≤5 mm.

In an embodiment of this application, the insulation layer includes ceramic particles, where an average particle size of the ceramic particles is 10 nm to 20 μm, porosity of the insulation layer is 10% to 60%, and an average pore diameter of the insulation layer is 20 nm to 50 μm.

In an embodiment of this application, the insulation layer satisfies at least one of the following characteristics:

(a) the average particle size of the insulation ceramic particles is 100 nm to 10 μm;

(b) the porosity of the insulation layer is 20% to 40%; or (c) the average pore diameter of the insulation layer is 200 nm to 20 μm.

In an embodiment of this application, the insulation layer further includes a binder and the binder accounts for 5% to 40% of the insulation layer by mass.

In an embodiment of this application, the binder includes at least one of polyamide, polyurethane, ethylene vinyl acetate copolymer, ethylene vinyl alcohol copolymer, polyacrylate, polyvinylidene fluoride, or polyvinylidene fluoride-hexafluoropropylene copolymer.

In an embodiment of this application, the insulation layer includes at least one of $HfO_2$, $SrTiO_3$, $SnO_2$, $CeO_2$, MgO, NiO, CaO, BaO, ZnO, $ZrO_2$, $Y_2O_3$, $Al_2O_3$, $TiO_2$, $SiO_2$, boehmite, magnesium hydroxide, aluminum hydroxide, lithium phosphate, lithium titanium phosphate, lithium aluminum titanium phosphate, lithium lanthanum titanate, lithium germanium thiophosphate, lithium nitride, $SiS_2$ glass, $P_2S_5$ glass, $Li_2O$, LiF, LiOH, $Li_2CO_3$, $LiAlO_2$, lithium germanium phosphorous sulfur ceramics, or garnet ceramics.

A second aspect of this application provides an electrochemical apparatus, including the partition plate according to any one of the foregoing embodiments.

In an embodiment of this application, the electrochemical apparatus includes at least two electrode assemblies, where the partition plate is hermetically connected to an outer packaging to form separate chambers on two sides of the partition plate, with each sealed chamber containing one electrode assembly and an electrolyte.

A third aspect of this application provides an electronic apparatus, including the electrochemical apparatus according to the second aspect of this application.

This application provides a partition plate and an electrochemical apparatus and electronic apparatus including such partition plate, where a positive electrode membrane and a negative electrode membrane are disposed on a partition substrate, increasing an active material content in the electrochemical apparatus, thereby improving the energy density of the electrochemical apparatus. In addition, an insulation layer is provided at the periphery of the positive electrode membrane, a zone surrounded by orthographic projection of an outer edge of the insulation layer on the partition substrate covers orthographic projection of the negative electrode membrane on the partition substrate, so that an AC overhang zone on the side of the negative electrode membrane has the same compacted density as the electrode plate zone after cold pressing. This not only eliminates local lithium precipitation occurring in a low compacted density zone because of uneven compacted density, but also reduces occurrence of curving and damage on the edge of the partition plate, improving self-discharge and safety performances of the electrochemical apparatus.

BRIEF DESCRIPTION OF DRAWINGS

To describe technical solutions in this application and the prior art more clearly, the following briefly describes accompanying drawings required in the embodiments and the prior art. Apparently, the accompanying drawings in the following descriptions show merely some embodiments in this application, and a person of ordinary skill in the art may derive other technical solutions from these accompanying drawings.

DETAILED DESCRIPTION

Figure 1:
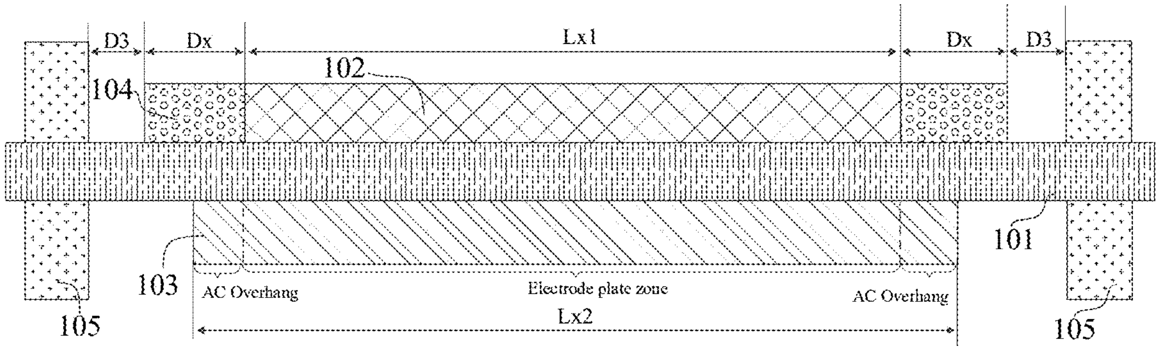
FIG. 1 is a schematic structural diagram of a partition plate according to an embodiment of this application.

To make the objectives, technical solutions, and advantages of this application more comprehensible, the following describes this application in detail with reference to accompanying drawings and embodiments. Apparently, the described embodiments are merely some but not all of the embodiments of this application. All other technical solutions obtained based on the embodiments of this application fall within the protection scope of this application.

It should be noted that, in the specific embodiments of this application, an example in which a lithium-ion battery is used as an electrochemical apparatus is used to illustrate this application. However, the electrochemical apparatus in this application is not limited to a lithium-ion battery.

In the prior art, a plurality of electrochemical units are usually connected internally in series to form a single lithium-ion battery, to increase an output voltage of the lithium-ion battery. An electrode plate used in such lithium-ion battery is a bipolar electrode plate. The bipolar electrode plate is coated with a positive electrode active substance on one side and coated with a negative electrode active substance on the other side. For safety of the lithium-ion battery, a coating area of the negative electrode active substance is typically larger than a coating area of the positive electrode active substance, to avoid local lithium precipitation occurring due to the negative electrode active substance is less than the positive electrode active substance at the edge of the lithium-ion battery. However, the bipolar electrode plate is a double-sided heterogeneous electrode plate. In a cold pressing process of the bipolar electrode plate, the two sides of the bipolar electrode plate need to be cold-pressed simultaneously. In this case, because a total thickness of the electrode plate outside the positive electrode active substance coating zone which is corresponding to the electrode plate at an edge of the negative electrode active substance coating zone (AC Overhang zone) is consistent with a total thickness of the electrode plate inside the positive electrode active substance coating zone, the following problems are likely to occur:

(1) Phenomena such as curving and coating fall-off occur at the edge of the positive electrode active substance coating zone and a negative electrode active substance coating zone corresponding to such location after cold pressing, resulting in problems such as local lithium precipitation at the edge of the bipolar electrode plate and an abnormal self-discharge rate of the lithium-ion battery.

(2) Compacted density of the AC overhang zone in the negative electrode active substance coating zone is lower than that of other zones after cold pressing, and as a result, local potential of the low compacted density zone is lower, and local lithium precipitation is likely to occur during cycling, resulting in a decreased capacity retention rate of the lithium-ion battery after cycling.

(3) Curving is likely to occur at a current collector at the edge of the positive electrode active substance coating zone after cold pressing, which reduces mechanical strength of the current collector, affecting the safety of the lithium-ion battery.

Figure 2:
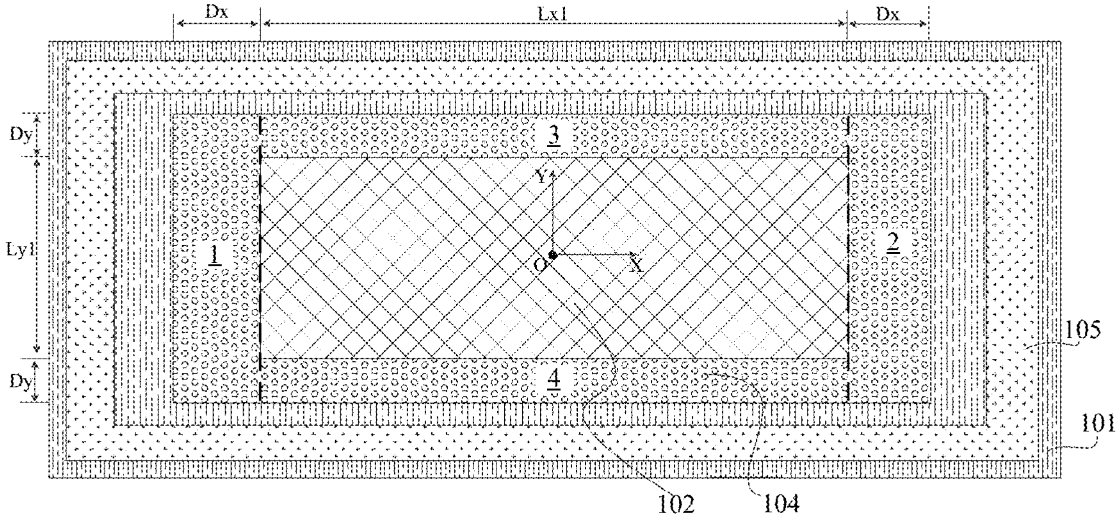
FIG. 2 is a top view of a partition plate according to an embodiment of this application.

In view of this, this application provides a partition plate. FIG. 1 is a schematic structural diagram of a partition plate according to an embodiment of this application. FIG. 2 is a top view of a partition plate according to an embodiment of this application. As shown in FIG. 1 and FIG. 2, the partition plate includes a partition substrate 101, a positive electrode membrane 102, a negative electrode membrane 103, and an insulation layer 104. The positive electrode membrane 102 and the negative electrode membrane 103 are respectively located on two surfaces of the partition substrate 101. The insulation layer 104 is disposed on the partition substrate 101 and the insulation layer 104 is disposed at a periphery of the positive electrode membrane 102; and a zone surrounded by orthographic projection of an outer edge of the insulation layer 104 on the partition substrate 101 covers orthographic projection of the negative electrode membrane 103 on the partition substrate 101, ensuring that an AC overhang zone on a side of the negative electrode membrane 103 has the same compacted density as an electrode plate zone. This not only eliminates local lithium precipitation occurring in a low compacted density zone due to the electrode plate zone has uneven compacted density, but also reduces occurrence of curving and damage on the edge of the partition plate, thereby reducing a self-discharge rate, and improving safety performance of the lithium-ion battery.

It can be seen from FIG. 1 that a length of the positive electrode membrane 102 is less than a length of the negative electrode membrane 103. This is because a coating area of the negative electrode active material is typically larger than a coating area of the positive electrode active material to improve the safety performance of the lithium-ion battery.

In an embodiment of this application, referring to FIG. 1, a negative electrode membrane zone is present in a counterpart of a zone corresponding to the positive electrode membrane 102 on an opposite side of the partition substrate 101, which is the electrode plate zone shown in FIG. 1; and a negative electrode membrane zone is present in at least part of a counterpart of a zone corresponding to the insulation layer 104 on an opposite side of the partition substrate 101, which is the AC overhang zone shown in FIG. 1. The insulation layer 104 is set to exceed the AC overhang zone on the opposite side, so that the electrode plate zone and the AC overhang zone can have the same compacted density during cold pressing.

In addition, although the insulation layer 104 exceeds the AC overhang zone on the opposite side, because of the insulation layer 104 is insulated, even if curving or coating fall-off occurs at the insulation layer 104 after cold pressing, local lithium precipitation won't be caused at the edge of the anode, and self-discharge and safety performances of the lithium-ion battery will not be affected.

In an embodiment of this application, orthographic projection of a geometric center of the positive electrode membrane 102 on the partition substrate 101 coincides at a point O with orthographic projection of a geometric center of the negative electrode membrane 103 on the partition substrate 101, a length in a radiating direction from the geometric center to an outer edge of the positive electrode membrane 102 is L1, meaning that a distance from the geometric center to the outer edge of the positive electrode membrane 102 is L1; and in the same radiating direction, a length from the outer edge of the positive electrode membrane to the outer edge of the insulation layer is D, and a length from the geometric center to an outer edge of the negative electrode membrane is L2, meaning that a distance from the geometric center to the outer edge of the negative electrode membrane 103 is L2, where the following geometric relationships are satisfied:

$$L1<L2 \text{ and } L1+D\geq L2.$$

It can be understood that in the description of the relationships between L1, L2, and D, "in the same radiating direction" may refer to radiation along long-side directions of both the positive electrode membrane and the negative electrode membrane or radiation along short-side directions of both the positive electrode membrane and the negative electrode membrane. For ease of description, in the following content, the direction of radiation along the long-side directions of the positive electrode membrane and the negative electrode membrane is defined as an X direction, and the direction of radiation along the short-side directions of the positive electrode membrane and the negative electrode membrane is defined as a Y direction. Correspondingly, Dx and Dy are respectively used to differentiate D-s in different radiating directions.

Herein, $$\frac{Lx1}{2} \text{ and } \frac{Ly1}{2}$$

are used to differentiate L1-s in different radiating directions.

Herein, $$\frac{Lx2}{2} \text{ and } \frac{Ly2}{2}$$

are used to differentiate L2-s in different radiating directions. Lx1 is a length of the positive electrode membrane, Ly1 is a width of the positive electrode membrane, Lx2 is a length of the negative electrode membrane, and Ly2 is a width of the negative electrode membrane.

In an embodiment of this application, when 0 mm≤L1+D−L2≤4.5 mm, preferably 1 mm≤L1+D−L2≤2.5 mm, the lithium-ion battery has better performance.

In an embodiment of this application, when 0.5 mm≤D≤5 mm, preferably 1.5 mm≤D≤3 mm, the lithium-ion battery has better performance.

Figure 3:
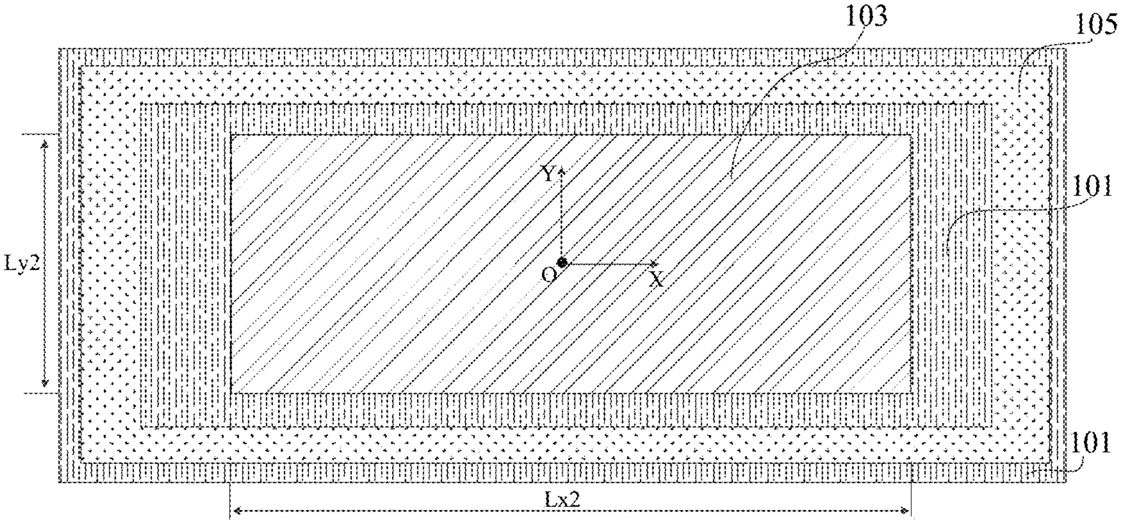
FIG. 3 is a bottom view of a partition plate according to an embodiment of this application.

In an embodiment of this application, as shown in FIG. 2 and FIG. 3, the positive electrode membrane 102 and the negative electrode membrane 103 are rectangular, and orthographic projection of a geometric center of the positive electrode membrane 102 on the partition substrate 101 coincides at a point O with orthographic projection of a geometric center of the negative electrode membrane 103 on the partition substrate 101.

A rectangular coordinate system can be established based on a length direction and a width direction of the partition plate. An X direction represents the length direction of the partition plate, and a Y direction represents a width direction of the partition plate. The positive electrode membrane 102, the negative electrode membrane 103, and the insulation layer 104 satisfy the following geometric relationships:

$$Lx1 < Lx2,\ Ly1 < Ly2,\ \frac{Lx1}{2} + Dx \geq \frac{Lx2}{2},\ \text{and}\ \frac{Ly1}{2} + Dy \geq \frac{Ly2}{2}$$

Lx1 is a length of the positive electrode membrane 102, Ly1 is a width of the positive electrode membrane 102, Lx2 is a length of the negative electrode membrane 103, Ly2 is a width of the negative electrode membrane 103, Dx is a width of an extension portion of the insulation layer 104 relative to the positive electrode membrane 102 in a long-side direction of the positive electrode membrane 102, and Dy is a width of an extension portion of the insulation layer 104 relative to the positive electrode membrane 102 in a short-side direction of the positive electrode membrane 102.

The inventors have found that when the positive electrode membrane 102, the negative electrode membrane 103, and the insulation layer 104 satisfy the foregoing geometric relationships, it can be ensured that an AC overhang zone on a side of the negative electrode membrane 103 has the same compacted density as the electrode plate zone. This not only eliminates local lithium precipitation occurring in a low compacted density zone due to the electrode plate zone has uneven compacted density, but also reduces occurrence of curving and damage on the edge of the partition plate, thereby reducing a self-discharge rate and improving safety performance of the lithium-ion battery.

In an embodiment of this application, as shown in FIG. 2, the extension portion of the insulation layer 104 in the long-side direction of the positive electrode membrane 102 includes a first portion 1 and a second portion 2, and the extension portion of the insulation layer 104 in the short-side direction of the positive electrode membrane 102 includes a third portion 3 and a fourth portion 4, where the first portion 1 and the second portion 2 may have a same width Dx or different widths Dx and the third portion 3 and the fourth portion 4 may have a same width Dy or different widths Dy, as long as the objective of this application can be achieved.

This application imposes no particular limitation on the partition substrate 101 as long as the objective of this application can be achieved. For example, the partition substrate 101 may include a polymer material layer, and the polymer material layer may be plated with different metals on two sides to form metal layers, for example, a first metal M, including at least one of Cu, Ni, Ti, Ag, Au, Pt, stainless steel, or an alloy thereof; and a second metal N applied on the other side, including at least one of Al, Ni, Ti, Ag, Au, Pt, stainless steel, or an alloy thereof, to carry different active materials respectively. Conductive materials such as graphite and conductive carbon fiber may be added to the polymer material layer, so that the polymer material layer is electronically conductive and ionically insulated. The first metal M and the second metal N may be the same or different but should be compatible with the active materials applied on their surfaces and provide appropriate oxidation resistant or reduction resistant performance. In addition, this application imposes no particular limitation on a thickness of the partition substrate 101. For example, the polymer material layer may have a thickness of 5 μm to 500 μm, the first metal M may have a thickness of 0.95 μm to 800 μm, and the second metal N may have a thickness of 0.95 μm to 200 μm.

Alternatively, the partition substrate 101 may be a metal plate, where the metal plate may include at least one of Ni, Ti, Ag, Au, Pt, or stainless steel, and the metal plate may have a thickness of 10 μm to 200 μm.

Further, this application imposes no particular limitation on a polymer material used in the polymer material layer, as long as the objective of this application can be achieved. For example, the polymer material layer may include: at least one of polyethylene terephthalate, polybutylene terephthalate, polyethylene naphthalate, polyether ether ketone, polyimide, polyamide, polyethylene glycol, polyamide-imide, polycarbonate, cyclic polyolefin, polyphenylene sulfide, polyvinyl acetate, polytetrafluoroethylene, polymethylene naphthalene, polyvinylidene fluoride, polyethylene naphthalate, polypropylene carbonate, poly(vinylidene fluoride-hexafluoropropylene), poly(vinylidene fluoride-co-chlorotrifluoroethylene), organic silicon resin, vinylon, polypropylene, polyethylene, polyvinyl chloride, polystyrene, polyether nitrile, polyurethane, polyphenylene ether, polysulfone, or derivatives of these substances.

In this application, the positive electrode membrane 102 may include a positive electrode active material, and the negative electrode membrane 103 may include a negative electrode active material; or the positive electrode membrane 102 may be directly formed by applying a positive electrode active material on the partition substrate 101, and the negative electrode membrane 103 may be directly formed by applying a negative electrode active material on the partition substrate 101.

In an embodiment of this application, an electrical resistivity of the insulation layer 104 is greater than $10^7$ Ω·m and preferably greater than $10^{10}$ Ω·m, which is not limited by any theory, the greater the electrical resistivity of the insulation layer 104, the better the insulation performance of the insulation layer 104.

In an embodiment of this application, when $$0 \leq \frac{Lx1}{2} + Dx - \frac{Lx2}{2} \leq 4.5\ \text{mm}$$

$$\text{and}\ 0 \leq \frac{Ly1}{2} + Dy - \frac{Ly2}{2} \leq 4.5\ \text{mm},$$

the lithium-ion battery has better performance.

In an embodiment of this application, further, when $$1\ \mu\text{m} \leq \frac{Lx1}{2} + Dx - \frac{Lx2}{2} \leq 2.5\ \text{mm}$$

$$\text{and}\ 1\ \text{mm} \leq \frac{Ly1}{2} + Dy - \frac{Ly2}{2} \leq 2.5\ \text{mm},$$

the lithium-ion battery has better performance.

In an embodiment of this application, because of the insulation material in the insulation layer 104 does not participate in any electrochemical reaction, with 0.5 mm≤Dx≤5 mm and 0.5 mm≤Dy≤5 mm to control widths of the insulation layer in the X direction and the Y direction, the amount of insulation material added can be controlled, thereby avoiding introducing excessive inactive material into the lithium-ion battery and improving energy density of the lithium-ion battery while achieving the objective of this application.

In an embodiment of this application, Dx preferably satisfies 1.5 mm≤Dx≤3 mm; and Dy preferably satisfies 1.5 mm≤Dy≤3 mm, thereby further improving performance of the lithium-ion battery.

This application imposes no particular limitation on a thickness of the insulation layer 104, as long as the objective of this application is achieved. For example, the thickness of the insulation layer 104 may be set based on a thickness of the positive electrode membrane 102, as long as the insulation layer 104 and the positive electrode membrane 102 have a same thickness after cold pressing, so that compacted density of the AC overhang zone is more consistent with that of the electrode plate zone after the negative electrode membrane 103 on the opposite side is cold pressed.

In addition, this application imposes no particular limitation on an insulation material used for insulation layer 104, as long as the objective of this application is achieved. For example, the insulation layer may include at least one of $HfO_2$, $SrTiO_3$, $SnO_2$, $CeO_2$, MgO, NiO, CaO, BaO, ZnO, $ZrO_2$, $Y_2O_3$, $Al_2O_3$, $TiO_2$, $SiO_2$, boehmite, magnesium hydroxide, or aluminum hydroxide, or may include a material with lithium-ion conductivity, for example, at least one of lithium phosphate ($Li_3PO_4$), lithium titanium phosphate, lithium aluminum titanium phosphate, lithium lanthanum titanate, lithium germanium thiophosphate, lithium nitride, $SiS_2$ glass, $P_2S_5$ glass, $Li_2O$, LiF, LiOH, $Li_2CO_3$, $LiAlO_2$, $Li_2O—Al_2O_3—SiO_2—P_2O_5—TiO_2—GeO_2$ ceramics, or garnet ceramics.

A general formula of lithium titanium phosphate may be $(Li_xTi_y(PO_4)_3$, where $0<x<2$ and $0<y<3$.

A general formula of lithium aluminum titanium phosphate may be $(Li_xAl_yTi_z(PO_4)_3$, where $0<x<2$, $0<y<1$, and $0<z<3$.

A general formula of lithium lanthanum titanate may be $Li_xLa_yTiO_3$, where $0<x<2$ and $0<y<3$.

A general formula of lithium germanium thiophosphate may be $Li_xGe_yP_zS_w$, where $0<x<4$, $0<y<1$, $0<z<1$, and $0<w<5$.

A general formula of lithium nitride may be $Li_xN_y$, where $0<x<4$ and $0<y<2$.

A general formula of $SiS_2$ glass may be $Li_xSi_yS_z$, where $0≤x<3$, $0<y<2$, and $0<z<4$.

A general formula of $P_2S_5$ glass may be $Li_xSi_yS_z$, where $0≤x<3$, $0<y<3$, and $0<z<7$.

A general formula of lithium germanium phosphorous sulfur ceramics may be $Li_2O—Al_2O_3—SiO_2—P_2O_5—TiO_2—GeO_2$.

A general formula of garnet ceramics is $Li_3+xLa_3M_2O_{12}$, where $0≤x≤5$, and M includes at least one of Te, Nb, or Zr.

In an embodiment of this application, as shown in FIG. 1 and FIG. 2, the partition plate may further include a sealing layer 105, the sealing layer 105 is located at a periphery of the partition plate and is configured to improve a packaging effect, and a distance between the insulation layer 104 and the sealing layer 105 is D3, where 0≤D3≤20 mm and preferably 2≤D3≤5 mm, so that a better sealing effect is implemented for the lithium-ion battery, thereby reducing a self-discharge rate of the lithium-ion battery and improving self-discharge performance of the lithium-ion battery.

This application imposes no particular limitation on a material used for the sealing layer 105 as long as the objective of this application can be achieved. For example, the material may include at least one of polypropylene, polyester plastic, or 4-hydroxybenzaldehyde (PHBA).

In an embodiment of this application, the insulation layer 104 includes ceramic particles, where the ceramic particles have excellent insulation properties, an average particle size of the ceramic particles is 10 nm to 20 μm, preferably 100 nm to 10 μm, porosity of the insulation layer is 10% to 60%, preferably 20% to 40%, and an average pore diameter of the insulation layer is 20 nm to 50 μm, preferably 200 nm to 20 μm.

In an embodiment of this application, the insulation layer further includes a binder such that the insulating ceramic particles in the insulation layer can be more firmly fastened, thereby reducing coating fall-off of the insulation layer during cold pressing. The binder typically accounts for 5% to 40% of the insulation layer by mass, to ensure that the insulation layer has good insulating and mechanical performance.

This application imposes no particular limitation on the binder as long as the objective of this application can be achieved. The binder may include at least one of polyamide, polyurethane, ethylene vinyl acetate copolymer, ethylene vinyl alcohol copolymer, polyacrylate, polyvinylidene fluoride, or polyvinylidene fluoride-hexafluoropropylene copolymer.

This application imposes no particular limitation on an insulation layer preparing method as long as the objective of this application can be achieved. For example, the insulation layer may be prepared in various methods such as a slurry coating method, a glue coating method, and a 3D printing method.

This application provides a partition plate, where an insulation layer is provided at a periphery of a positive electrode membrane, and a zone surrounded by orthographic projection of an outer edge of the insulation layer on a partition substrate covers orthographic projection of a negative electrode membrane on the partition substrate, so that an AC overhang zone on the side of the negative electrode membrane has the same compacted density as an electrode plate zone after cold pressing. This not only eliminates local lithium precipitation occurring in a low compacted density zone because of uneven compacted density, but also reduces occurrence of curving and damage on the edge of the partition plate, improving self-discharge and safety performances of an electrochemical apparatus when the partition plate is used as an electrode plate.

This application further provides an electrochemical apparatus, and the electrochemical apparatus includes at least one partition plate in the foregoing embodiments of this application.

In an embodiment of this application, the electrochemical apparatus includes at least two electrode assemblies, where the partition plate is hermetically connected to an outer packaging to form separate sealed chambers on two sides of the partition plate, with each sealed chamber containing one electrode assembly and an electrolyte to form a separate electrochemical unit. The partition plate are coated with active materials with opposite polarities on two sides, respectively.

Figure 4:
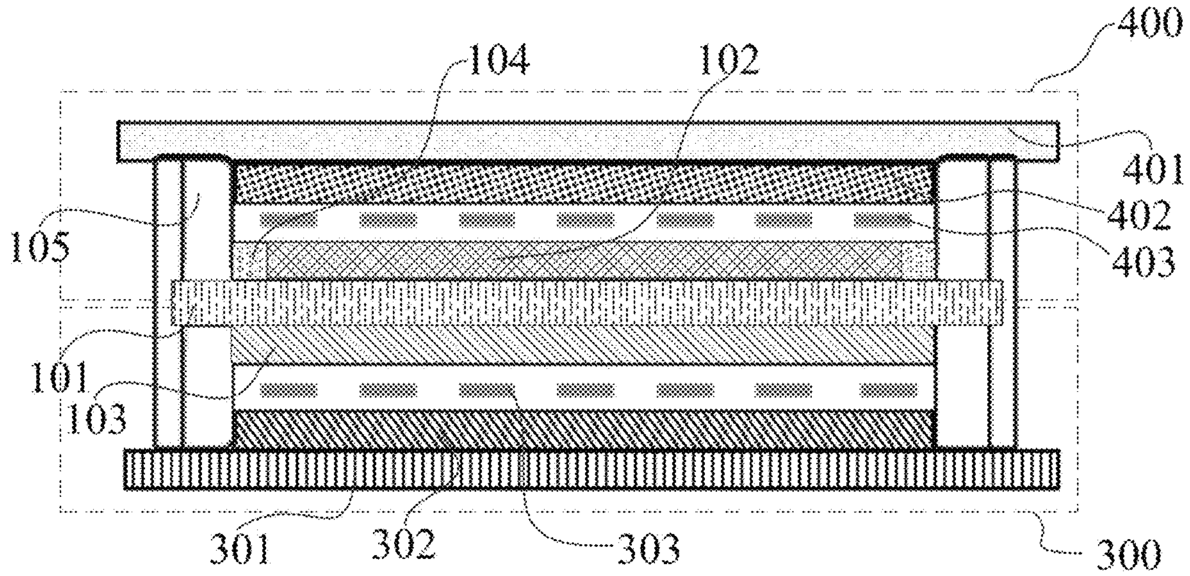
FIG. 4 is a schematic structural diagram of an electrochemical apparatus according to an embodiment of this application.

FIG. 4 is a schematic structural diagram of an electrochemical apparatus according to an embodiment of this application. As shown in FIG. 4, the partition plate separates the electrochemical apparatus into two electrode assemblies, namely, a first electrode assembly 300 and a second electrode assembly 400. The first electrode assembly 300 includes a positive electrode plate 301, a positive electrode active material layer 302, and a first separator 303 from bottom to top in FIG. 4. The second electrode assembly 400 includes a negative electrode plate 401, a negative electrode active material layer 402, and a second separator 403 from top to bottom in FIG. 4. The negative electrode membrane 103 of the partition substrate 101 is adjacent to the positive electrode active material layer 302 of the first electrode assembly 300, and the positive electrode membrane 102 of the partition substrate 101 is adjacent to the negative electrode active material layer 402 of the second electrode assembly 400. In addition, the electrochemical apparatus may also be sealed by the sealing layer 105, so that a structure of two separate chambers is formed in the electrochemical apparatus; and the two chambers respectively correspond to the first electrode assembly 300 and the second electrode assembly 400.

In an embodiment, one tab may be extended from each of two adjacent electrode assemblies, and the tabs of the two electrode assemblies have opposite polarities. For example, when a side of the partition plate adjacent to the first electrode assembly is a positive electrode membrane and a side of the partition plate adjacent to the second electrode assembly is a negative electrode membrane, a negative tab is extended from the first electrode assembly, and a positive tab is extended from the second electrode assembly. In this case, an output voltage between the two tabs is a sum of output voltages of two electrochemical units.

In an embodiment, two tabs may be extended from each of two adjacent electrode assemblies. For example, when a side of the partition plate adjacent to the first electrode assembly is a positive electrode membrane and a side of the partition plate adjacent to the second electrode assembly is a negative electrode membrane, a positive tab of the first electrode assembly is connected in series with a negative tab of the second electrode assembly, and a negative tab of the first electrode assembly and a positive tab of the second electrode assembly are output tabs, where an output voltage is a sum of the output voltages of the two electrochemical units. In this case, the partition plate serves as a bipolar electrode plate, so that two adjacent electrochemical units are both internally connected in series through the partition plate and externally connected in series through the tabs.

In an embodiment, when the partition plate serves as a bipolar electrode plate, another tab may be extended from the partition plate for monitoring an operating status of the lithium-ion battery.

In an embodiment of this application, there may be a primer layer between the partition substrate of the partition plate and the positive electrode membrane or the negative electrode membrane, and the primer layer is configured to improve adhesion performance between the partition substrate and the active substance. The primer layer is typically obtained by applying, on the partition substrate, a slurry formed by mixing conductive carbon black, styrene-butadiene rubber, and deionized water, and then drying the slurry, and primer layers on two sides of the partition substrate may be identical or different.

The positive electrode plate in this application is not particularly limited, provided that the objective of this application can be achieved. For example, the positive electrode plate typically includes a positive electrode current collector and a positive electrode active material. The positive electrode current collector is not particularly limited, and may be any positive electrode current collector known in the art, such as aluminum foil, aluminum alloy foil, or a composite current collector. The positive electrode active material is not particularly limited, and may be any positive electrode active material in the prior art. The positive electrode active material includes at least one of NCM811, NCM622, NCM523, NCM111, NCA, lithium iron phosphate, lithium cobalt oxide, lithium manganate oxide, lithium manganese iron phosphate, or lithium titanate.

The negative electrode plate in this application is not particularly limited, provided that the objective of this application can be achieved. For example, the negative electrode plate typically includes a negative electrode current collector and a negative electrode active material layer. The negative electrode current collector is not particularly limited, and may be any negative electrode current collector known in the art, such as copper foil, aluminum foil, aluminum alloy foil, and a composite current collector. The negative electrode active material layer includes a negative electrode active material. The negative electrode active material is not particularly limited, and may be any negative electrode active material known in the art. For example, the negative electrode active material may include at least one of artificial graphite, natural graphite, carbonaceous mesophase spherule, soft carbon, hard carbon, silicon, silicon carbon, lithium titanate, or the like.

The electrolyte in this application is not particularly limited, and may be any electrolyte known in the art, for example, an electrolyte in any one of a gel state, a solid state, and a liquid state. For example, a liquid electrolyte may include a lithium salt and a non-aqueous solvent.

The lithium salt is not particularly limited, and may be any lithium salt known in the art provided that the objective of this application can be achieved. For example, the lithium salt may include at least one of lithium hexafluorophosphate ($LiPF_6$), lithium tetrafluoroborate ($LiBF_4$), lithium difluorophosphate ($LiPO_2F_2$), lithium bis(fluorosulfonyl)imide $LiN(CF_3SO_2)_2$(LiTFSI), lithium bis(fluorosulfonyl)imide $Li(N(SO_2F)_2)$(LiFSI), lithium bis(oxalate)borate $LiB(C_2O_4)_2$ (LiBOB), or lithium difluoro(oxalato)borate $LiBF_2(C_2O_4)$ (LiDFOB). For example, $LiPF_6$ can be used as the lithium salt.

The non-aqueous solvent is not particularly limited, provided that the objective of this application can be achieved. For example, the non-aqueous solvent may include at least one of a carbonate compound, a carboxylate compound, an ether compound, a nitrile compound, or other organic solvents.

For example, the carbonate compound may include at least one of diethyl carbonate (DEC), dimethyl carbonate (DMC), ethyl methyl carbonate (EMC), dipropyl carbonate (DPC), methyl propyl carbonate (MPC), ethyl propyl carbonate (EPC), methyl ethyl carbonate (MEC), ethylene carbonate (EC), propylene carbonate (PC), butylene carbonate (BC), vinyl ethylene carbonate (VEC), fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methylethylene carbonate, 1-fluoro-l-methylethylene carbonate, 1,2-difluoro-l-methylethylene carbonate, 1,1,2-trifluoro-2-methylethylene carbonate, or trifluoromethylethylene carbonate.

The separator in this application is not particularly limited. For example, the separator includes a polymer or an inorganic substance formed by a material stable to the electrolyte of this application.

For example, the separator may include a substrate layer and a surface treatment layer. The substrate layer may be a non-woven fabric, membrane, or composite membrane having a structure, and a material of the substrate layer may be selected from at least one of polyethylene, polypropylene, polyethylene terephthalate, or polyimide. Optionally, a polypropylene membrane, a polyethylene membrane, polypropylene nonwoven fabric, polyethylene nonwoven fabric, or a polypropylene-polyethylene-polypropylene composite membrane can be used. Optionally, the surface treatment layer is provided on at least one surface of the substrate layer, and the surface treatment layer may be a polymer layer or an inorganic layer, or may be a layer formed by mixing a polymer and an inorganic substance.

For example, the inorganic layer includes inorganic particles and a binder. The inorganic particles are not particularly limited, and may be selected from, for example, at least one of aluminum oxide, silicon oxide, magnesium oxide, titanium oxide, hafnium oxide, tin oxide, ceria oxide, nickel oxide, zinc oxide, calcium oxide, zirconium oxide, yttrium oxide, silicon carbide, boehmite, aluminum hydroxide, magnesium hydroxide, calcium hydroxide, or barium sulfate. The binder is not particularly limited, and may be selected from, for example, a combination of one or more of polyvinylidene fluoride, vinylidene fluoride-hexafluoropropylene copolymer, polyamide, polyacrylonitrile, polyacrylate, polyacrylic acid, polyacrylate, polyvinylpyrrolidone, polyvinyl ether, polymethyl methacrylate, polytetrafluoroethylene, and polyhexafluoropropylene. The polymer layer includes a polymer, and a material of the polymer includes at least one of polyamide, polyacrylonitrile, acrylate polymer, polyacrylic acid, polyacrylate, polyvinylpyrrolidone, polyvinyl ether, polyvinylidene fluoride, or poly(vinylidene fluoride-hexafluoropropylene).

The electrochemical apparatus provided according to this application uses a partition with an insulation layer provided at a periphery of a positive electrode membrane, where a zone surrounded by orthographic projection of an outer edge of the insulation layer on a partition substrate covers orthographic projection of a negative electrode membrane on the partition substrate, so that an AC overhang zone on the side of the negative electrode membrane has the same compacted density as the electrode plate zone after cold pressing. This not only eliminates local lithium precipitation occurring in a low compacted density zone because of uneven compacted density, but also reduces occurrence of curving and damage on the edge of the partition, improving self-discharge performance and safety of the electrochemical apparatus when the partition is used as an electrode plate.

This application further provides an electronic apparatus, which includes the electrochemical apparatus provided in the embodiments of this application.

The electrode assembly in this application is not particularly limited, and may be any electrode assembly in the prior art provided that the objective of this application can be achieved. For example, a laminated electrode assembly or a wound electrode assembly can be used. The electrode assembly typically includes a positive electrode plate, a negative electrode plate, and a separator.

The following describes the embodiments of this application more specifically by using examples and comparative examples. Various tests and evaluations were performed in the following methods. In addition, unless otherwise specified, "part" and "%" are based on mass.

EXAMPLE 1

Preparation of a Partition Plate

Preparation of an insulation layer slurry: Boehmite and polyvinylidene fluoride PVDF were mixed at a mass ratio of 95:5, then dispersed in a mixed solvent including DMF and acetone, and stirred thoroughly to obtain a uniform insulation layer slurry with a 40% solid content. A volume ratio of DMF to acetone in the mixed solvent was 7:3.

Preparation of a positive electrode slurry: Positive electrode active material lithium cobalt oxide ($LiCoO_2$), conductive carbon black (Super P), and PVDF were mixed at a mass ratio of 97.5:1.0:1.5, and NMP was added as a solvent to prepare a slurry with a 75% solid content which was stirred uniformly.

Preparation of a negative electrode slurry: Negative electrode active material graphite, conductive carbon black (Super P), and styrene-butadiene rubber (SBR) were mixed at a mass ratio of 96:1.5:2.5, and deionized water was added as a solvent to prepare a slurry with a 70% solid content which was stirred uniformly.

Preparation of a positive electrode membrane: A commercially available stainless steel partition substrate with a thickness of 20 μm was selected, and a layer of positive electrode slurry was first applied on a surface of the stainless steel partition substrate, and dried at 90° C. for 1 hour to obtain the positive electrode membrane. A thickness of the positive electrode membrane was 110 μm, a length Lx1 of the positive electrode membrane was 40 mm, and a width Ly1 of the positive electrode membrane was 34 mm.

Preparation of an insulation layer: A layer of insulation layer slurry was prepared at a periphery of the positive electrode membrane by using a gluing machine, and dried at 90° C. for 1 hour to obtain the insulation layer. A thickness of the insulation layer was 100 μm, and widths Dx and Dy of the insulation layer were both 5 mm.

Preparation of a negative electrode membrane: A layer of negative electrode slurry was applied on another surface of the stainless steel partition substrate, and dried at 110° C. for 1 hour to obtain the negative electrode membrane. A thickness of the negative electrode membrane was 130 μm, a length Lx2 of the negative electrode membrane was 46 mm, a width Ly2 of the negative electrode membrane was 40 mm, and $$\frac{Lx1}{2} + Dx - \frac{Lx2}{2} \text{ and } \frac{Ly1}{2} + Dy - \frac{Ly2}{2}$$

were both 2 mm.

Preparation of a partition plate: The stainless steel partition substrate with both surfaces coated was cold pressed by a cold roller to obtain the partition plate, where a thickness of the partition plate was 230 μm.

Preparation of a Negative Electrode Plate

Negative electrode active material graphite, conductive carbon black (Super P), and styrene-butadiene rubber (SBR) were mixed at a mass ratio of 96:1.5:2.5, and deionized water was added as a solvent to prepare a slurry with a 70% solid content which was stirred uniformly. The slurry was evenly applied on a surface of copper foil with a thickness of 10 μm, and dried at 110° C., to obtain a negative electrode plate with one face coated with a negative electrode active material layer and a coating thickness of 150 μm, and then the coating step was repeated on another surface of the negative electrode plate, to obtain a negative electrode plate with two faces coated with the negative electrode active material layer. The negative electrode plate was cut into a size of 41 mm×61 mm for use.

Preparation of a Positive Electrode Plate

Preparation of a positive electrode slurry: Positive electrode active material lithium cobalt oxide ($LiCoO_2$), conductive carbon black (Super P), and PVDF were mixed at a mass ratio of 97.5:1.0:1.5, and NMP was added as a solvent to prepare a slurry with a 75% solid content which was stirred uniformly. The slurry was evenly applied on a surface of aluminum foil with a thickness of 12 μm, and dried at 90° C., to obtain a positive electrode plate with a coating thickness of 100 μm, and then the coating step was repeated on another surface of the positive electrode plate, to obtain a positive electrode plate with two faces coated with the positive electrode active material layer. The positive electrode plate was cut into a size of 38 mm×58 mm for use.

Preparation of an Electrolyte

In an atmosphere of dry argon, organic solvents including ethylene carbonate (EC), ethyl methyl carbonate (EMC), and diethyl carbonate (DEC) were mixed at a mass ratio of 30:50:20, and then lithium hexafluorophosphate ($LiPF_6$) was dissolved into the organic solvents and mixed uniformly, to obtain an electrolyte. A molar concentration of $LiPF_6$ in the electrolyte was 1.15 mol/L.

Preparation of an Electrode Assembly

Preparation of a First Electrode Assembly

A polyethylene (PE) film with a thickness of 15 μm was selected as a separator, and one positive electrode plate was placed on each of two faces of the negative electrode plate, a layer of separator was placed between the positive electrode plate and the negative electrode plate, to form a stacked plate, and then four corners of the entire stacked structure were fastened, to obtain a first electrode assembly. The first electrode assembly has two tabs, one positive tab and one negative tab.

Preparation of a Second Electrode Assembly

The second electrode assembly was prepared in the same method as the first electrode assembly was prepared. The second electrode assembly also has two tabs, one positive tab and one negative tab.

Assembling of an Electrode Assembly

An aluminum-plastic film with a thickness of 90 μm formed through recess-punching was placed with a pit face up, the first electrode assembly was put into the pit of the aluminum-plastic film with a positive electrode plate of the first electrode assembly face up, and then the negative electrode membrane of the partition plate was put face down on the first electrode assembly, so that the positive electrode plate of the first electrode assembly was opposite the negative electrode membrane of the partition plate, to obtain a first assembly after compression.

For the first assembly, a positive electrode membrane of the partition plate was put face up. A negative electrode plate of the second electrode assembly was put face down on the partition plate, so that the negative electrode plate of the second electrode assembly was opposite the positive electrode membrane of the partition plate. Then another aluminum-plastic film with a thickness of 90 μm formed through recess-punching was put with a pit face down to cover the second electrode assembly. The two aluminum-plastic films were heat-sealed through hot pressing, so that the first electrode assembly and the second electrode assembly were separated by the partition plate, thereby obtaining an assembled electrode assembly. The assembled electrode assembly had two separate chambers. The first electrode assembly corresponded to a first chamber, the second electrode assembly corresponded to a second chamber, and a positive tab and a negative tab of both the first electrode assembly and the second electrode assembly were extended out of a packaging bag.

Electrolyte Injection and Packaging of the Electrode Assembly

An electrolyte was injected into the two chambers of the assembled electrode assembly and then the assembled electrode assembly was packaged. At that point, the first electrode assembly became a first electrochemical unit, and the second electrode assembly became a second electrochemical unit. A positive tab of the first electrochemical unit was conductively connected in series with a negative tab of the second electrochemical unit, to obtain a series-connected lithium-ion battery. No ion exchange was present between the two chambers of the series-connected lithium-ion battery.

For charging/discharging of the series-connected lithium-ion battery, a negative tab of the first electrochemical unit and a positive tab of the second electrochemical unit were connected. In addition, the series-connected tabs could be retained and used as voltage monitoring electrodes for the series-connected lithium-ion battery, or the series-connected tabs could be packaged with insulation within the series-connected lithium-ion battery.

EXAMPLE 2

All was the same as Example 1, except that electrical resistivity of the insulation layer was $2.70\times10^{10}$, and $Al_2O_3$ was selected as an insulation ceramic material.

EXAMPLE 3

All was the same as Example 2, except that electrical resistivity of the insulation layer was $3.50\times10^{13}$.

EXAMPLE 4

All was the same as Example 2, except that electrical resistivity of the insulation layer was $3.60\times10^{13}$, Dx and Dy were both 2 mm, and $$\frac{Lx1}{2}+Dx-\frac{Lx2}{2} \text{ and } \frac{Ly1}{2}+Dy-\frac{Ly2}{2}$$

were both 0 mm.

EXAMPLE 5

All was the same as Example 2, except that electrical resistivity of an insulation layer was $3.30\times10^{13}$, Dx and Dy were both 0.5 mm, and $$\frac{Lx1}{2}+Dx-\frac{Lx2}{2} \text{ and } \frac{Ly1}{2}+Dy-\frac{Ly2}{2}$$

were both 0 mm.

EXAMPLE 6

All was the same as Example 2, except that electrical resistivity of the insulation layer was $3.40\times10^{13}$, Dx and Dy were both 2 mm, and $$\frac{Lx1}{2}+Dx-\frac{Lx2}{2} \text{ and } \frac{Ly1}{2}+Dy-\frac{Ly2}{2}$$

were both 1 mm.

EXAMPLE 7

All was the same as Example 2, except that electrical resistivity of the insulation layer was $3.40\times10^{13}$, and $$\frac{Lx1}{2}+Dx-\frac{Lx2}{2} \text{ and } \frac{Ly1}{2}+Dy-\frac{Ly2}{2}$$

were both 4.5 mm.

EXAMPLE 8

All was the same as Example 2, except that electrical resistivity of the insulation layer was $3.50\times10^{13}$, Dx and Dy were both 2 mm, $$\frac{Lx1}{2}+Dx-\frac{Lx2}{2} \text{ and } \frac{Ly1}{2}+Dy-\frac{Ly2}{2}$$

were both 1 mm, and D3 was 1 mm.

EXAMPLE 9

All was the same as Example 8, except that electrical resistivity of the insulation layer was $3.40\times10^{13}$ and D3 was 3 mm.

EXAMPLE 10

All was the same as Example 8, except that electrical resistivity of the insulation layer was $3.30\times10^{13}$ and D3 was 20 mm.

EXAMPLE 11

All was the same as Example 9, except that electrical resistivity of the insulation layer was $5.70\times10^{9}$, and ZnO was used as an insulation ceramic material.

EXAMPLE 12

All was the same as Example 11, except that electrical resistivity of the insulation layer was $8.30\times10^{12}$, $Al_2O_3$ was used as an insulation ceramic material, and polyvinylidene fluoride-hexafluoropropylene (PVDF-HFP) was used as a binder.

EXAMPLE 13

All was the same as Example 9, except that an average particle size of insulation ceramic particles was 15 μm and an average pore diameter of the insulation layer was 50 μm.

EXAMPLE 14

All was the same as Example 13, except that porosity of the insulation layer was 30%.

EXAMPLE 15

All was the same as Example 14, except that electrical resistivity of the insulation layer was $3.50\times10^{13}$, an average particle size of insulation ceramic particles was 5 μm, and an average pore diameter of the insulation layer was 15 μm.

COMPARATIVE EXAMPLE 1

Preparation of a Negative Electrode Plate

Negative electrode active material graphite, conductive carbon black (Super P), and styrene-butadiene rubber (SBR) were mixed at a mass ratio of 96:1.5:2.5, and deionized water was added as a solvent to prepare a slurry with a 70% solid content which was stirred uniformly. The slurry was evenly applied on a surface of copper foil with a thickness of 10 μm, and dried at 110° C., to obtain a negative electrode plate with one face coated with a negative electrode active material layer and a coating thickness of 150 μm, and then the coating step was repeated on another face of the negative electrode plate, to obtain a negative electrode plate with two faces coated with the negative electrode active material layer. The negative electrode plate was cut into a size of 41 mm×61 mm for use.

Preparation of a Positive Electrode Plate

Preparation of a positive electrode slurry: Positive electrode active material lithium cobalt oxide ($LiCoO_2$), conductive carbon black (Super P), and PVDF were mixed at a mass ratio of 97.5:1.0:1.5, and NMP was added as a solvent to prepare a slurry with a 75% solid content which was stirred uniformly. The slurry was evenly applied on a surface of aluminum foil with a thickness of 12 μm, and dried at 90° C., to obtain a positive electrode plate with a coating thickness of 100 μm, and then the coating step was repeated on another face of the positive electrode plate, to obtain a positive electrode plate with two faces coated with the positive electrode active material layer. The positive electrode plate was cut into a size of 38 mm×58 mm for use.

Preparation of an Electrolyte

In an atmosphere of dry argon, organic solvents including ethylene carbonate (EC), ethyl methyl carbonate (EMC), and diethyl carbonate (DEC) were mixed at a mass ratio of 30:50:20, and then lithium hexafluorophosphate ($LiPF_6$) was dissolved into the organic solvents mixed uniformly, to obtain an electrolyte. A molar concentration of $LiPF_6$ in the electrolyte was 1.15 mol/L.

Preparation of Electrochemical Units

A negative electrode plate and a positive electrode plate were stacked to form a stack. A polyethylene (PE) film with a thickness of 15 μm was selected as a separator used between the positive electrode plate and the negative electrode plate, and then four corners of the entire stacked structure were fastened with an adhesive tape and put into an aluminum-plastic film. After top-side sealing, electrolyte injection, and packaging, an electrochemical unit was obtained.

At least two electrochemical units were prepared in the same manner and used as the first electrochemical unit and the second electrochemical unit respectively.

Preparation of a Series-Connected Lithium-Ion Battery

A negative electrode of the first electrochemical unit and a positive electrode of the second electrochemical unit were connected in series through a wire conductor to obtain a series-connected lithium-ion battery.

COMPARATIVE EXAMPLE 2

All was the same as Example 1, except that a partition plate made of stainless steel foil was used as the partition plate between the first electrode assembly and the second electrode assembly. A thickness of the stainless steel foil was approximately 20 μm.

COMPARATIVE EXAMPLE 3

All was the same as Example 1, except that the partition plate included no insulation layer.

Performance Tests

The series-connected lithium-ion batteries prepared in the examples and comparative examples were tested in the following methods:

0.1 C Discharge Energy Density Test

The battery was first charged to 8.90 V at 0.5 C, then constant-voltage charged to 0.025 C, and after standing for 5 minutes, was discharged to 6.0 V at 0.1 C, and a discharge capacity was recorded; and then 0.1 C discharge energy density was calculated according to this formula: energy density (Wh/kg)=discharge capacity (Wh)/mass of electrochemical apparatus (kg).

Cycling Test

At a test temperature of 25° C., the battery was constant-current charged to 8.90 V at 0.5 C, and then constant-voltage charged to 0.025 C. After standing for 5 minutes, the battery was discharged to 6.0 V at 0.5 C. A capacity obtained in this step was an initial capacity, and after 50 cycles of 0.5 C charge and 0.5 C discharge, a ratio of a capacity of the lithium-ion battery to the initial capacity was calculated.

Drop Test (1) The sample lithium-ion battery was left falling freely from a height of 1.5 meters to a smooth marble surface.
(2) The lithium-ion battery was checked for damage at a curving location of the partition plate at an edge of the positive electrode after the fall.
(3) 20 samples were tested and a quantity of damaged samples was recorded.

Self-Discharge Performance Test

After the capacity of the lithium-ion battery was tested, the lithium-ion battery was left standing for 48 hours at room temperature, and a voltage V1 of the lithium-ion battery was measured; then the lithium-ion battery was left standing for 48 more hours, and a voltage V2 of the lithium-ion battery was measured; and a value of K for representing self-discharge performance of the lithium-ion battery was calculated according to the following formula: $K=(V1-V2)/48$, where K was measured in mV/h.

TABLE 1

Test parameters and corresponding test results of examples and comparative examples

| | Electrical resistivity ($\Omega \cdot m$) of insulation layer | Dx and Dy (mm) | $\frac{Lx1}{2} + Dx - \frac{Lx2}{2}$ and $\frac{Ly1}{2} + Dy - \frac{Ly2}{2}$ (mm) | D3 (mm) | Average particle size of insulation ceramic particles (μm) | Porosity of insulation layer | Average pore diameter of insulation layer (μm) | Insulation ceramic material | Binder | 0.1 C discharge energy density (Wh/kg) | Discharge capacity after 50 cycles/ First-cycle discharge capacity (%) | Proportion of batteries with damage at a curving location of the partition plate at an edge of the positive electrode in the 1.5 m drop test | Self-discharge performance (mV/h) |
|---|---|---|---|---|---|---|---|---|---|---|---|---|---|
| Example 1 | $1.00 \times 10^{7}$ | 5 | 2 | 5 | 1 | 50% | 3 | Boehmite | PVDF | 592 | 85.60% | 0 out of 20 batteries damaged | 0.048 |
| Example 2 | $2.70 \times 10^{10}$ | 5 | 2 | 5 | 1 | 50% | 3 | $Al_2O_3$ | PVDF | 592 | 85.80% | 1 out of 20 batteries damaged | 0.043 |
| Example 3 | $3.50 \times 10^{13}$ | 5 | 2 | 5 | 1 | 50% | 3 | $Al_2O_3$ | PVDF | 592 | 85.90% | 1 out of 20 batteries damaged | 0.041 |
| Example 4 | $3.60 \times 10^{13}$ | 2 | 0 | 5 | 1 | 50% | 3 | $Al_2O_3$ | PVDF | 592 | 85.70% | 2 out of 20 batteries damaged | 0.053 |
| Example 5 | $3.30 \times 10^{13}$ | 0.5 | 0 | 5 | 1 | 50% | 3 | $Al_2O_3$ | PVDF | 593 | 85.60% | 3 out of 20 batteries damaged | 0.056 |
| Example 6 | $3.40 \times 10^{13}$ | 2 | 1 | 5 | 1 | 50% | 3 | $Al_2O_3$ | PVDF | 592 | 85.90% | 1 out of 20 batteries damaged | 0.041 |
| Example 7 | $3.40 \times 10^{13}$ | 5 | 4.5 | 5 | 1 | 50% | 3 | $Al_2O_3$ | PVDF | 592 | 85.90% | 1 out of 20 batteries damaged | 0.041 |
| Example 8 | $3.50 \times 10^{13}$ | 2 | 1 | 1 | 1 | 50% | 3 | $Al_2O_3$ | PVDF | 593 | 85.60% | 1 out of 20 batteries damaged | 0.044 |
| Example 9 | $3.40 \times 10^{13}$ | 2 | 1 | 3 | 1 | 50% | 3 | $Al_2O_3$ | PVDF | 593 | 85.90% | 1 out of 20 batteries damaged | 0.041 |
| Example 10 | $3.30 \times 10^{13}$ | 2 | 1 | 20 | 1 | 50% | 3 | $Al_2O_3$ | PVDF | 590 | 85.90% | 1 out of 20 batteries damaged | 0.041 |
| Example 11 | $5.70 \times 10^{9}$ | 2 | 1 | 3 | 1 | 50% | 3 | ZnO | PVDF | 593 | 85.90% | 0 out of 20 batteries damaged | 0.044 |
| Example 12 | $8.30 \times 10^{12}$ | 2 | 1 | 3 | 1 | 50% | 3 | $Al_2O_3$ | PVDF-HFP | 593 | 85.90% | 1 out of 20 batteries damaged | 0.042 |
| Example 13 | $3.40 \times 10^{13}$ | 2 | 1 | 3 | 15 | 50% | 50 | $Al_2O_3$ | PVDF | 593 | 85.90% | 1 out of 20 batteries damaged | 0.04 |

TABLE 1-continued

Test parameters and corresponding test results of examples and comparative examples

| | Electrical resistivity (Ω · m) of insulation layer | Dx and Dy (mm) | $\frac{Lx1}{2}+Dx-\frac{Lx2}{2}$ and $\frac{Ly1}{2}+Dy-\frac{Ly2}{2}$ (mm) | D3 (mm) | Average particle size of insulation ceramic particles (μm) | Porosity of insulation layer | Average pore diameter of insulation layer (μm) | Insulation ceramic material | Binder | 0.1 C discharge energy density (Wh/kg) | Discharge capacity after 50 cycles/ First-cycle discharge capacity (%) | Proportion of batteries with damage at a curving location of the partition plate at an edge of the positive electrode in the 1.5 m drop test | Self-discharge performance (mV/h) |
|---|---|---|---|---|---|---|---|---|---|---|---|---|---|
| Example 14 | $3.40 \times 10^{13}$ | 2 | 1 | 3 | 15 | 30% | 50 | $Al_2O_3$ | PVDF | 593 | 85.90% | 1 out of 20 batteries damaged | 0.038 |
| Example 15 | $3.50 \times 10^{13}$ | 2 | 1 | 3 | 5 | 30% | 15 | $Al_2O_3$ | PVDF | 593 | 85.90% | 1 out of 20 batteries damaged | 0.037 |
| Comparative Example 1 | — | — | — | — | — | — | — | — | — | 556 | 85.90% | — | 0.032 |
| Comparative Example 2 | — | — | — | — | — | — | — | — | — | 589 | 85.80% | — | 0.035 |
| Comparative Example 3 | — | — | — | — | — | — | — | — | — | 591 | 85.30% | 4 out of 20 batteries damaged | 0.109 |

It can be seen from Examples 1 to 15 and Comparative Examples 1 and 2 that the lithium-ion batteries provided with the bipolar partition plate of this application had significantly improved discharge energy density.

It can be seen from Examples 1 to 15 and Comparative Example 3 that there was the lithium-ion batteries provided with the bipolar partition plate of this application had improved capacity retention rates after cycling.

It can be seen from Examples 1 to 15 and Comparative Example 3 that the lithium-ion batteries provided with the bipolar partition plate of this application were less likely to have damage at the curving location of the partition plate at the edge of the positive electrode in the drop test, providing better safety for the lithium-ion batteries.

It can be seen from Examples 1 to 15 and Comparative Examples 1 to 3 that the lithium-ion batteries provided with the bipolar partition plate of this application had significant improved self-discharge performance.

It can be seen from Examples 1 to 3 that the capacity retention rate of the lithium-ion battery after cycling increased with the increase of electrical resistivity of the insulation layer, and the self-discharge performance was improved with the increase of electrical resistivity of the insulation layer.

The foregoing descriptions are merely preferable embodiments of this application, but are not intended to limit this application. Any modification, equivalent replacement, or improvement made without departing from the spirit and principle of this application shall fall within the protection scope of this application.

What is claimed is:

1. An electrochemical apparatus, comprising a partition plate, a first laminated electrode assembly, a second laminated electrode assembly, and an outer packaging; wherein the electrochemical apparatus further comprises a sealing layer, the partition plate extends through the sealing layer and is hermetically connected to the outer packaging to form a first sealed chamber and a second sealed chamber separated on two sides of the partition plate; the first sealed chamber contains the first laminated electrode assembly and a first electrolyte, and the second sealed chamber contains the second laminated electrode assembly and a second electrolyte; wherein the partition plate comprises a partition substrate, a positive electrode membrane, a negative electrode membrane, and an insulation layer; wherein, the positive electrode membrane and the negative electrode membrane are respectively located on two surfaces of the partition substrate;

the insulation layer is disposed on the partition substrate and the insulation layer is disposed at a periphery of the positive electrode membrane;

a zone surrounded by orthographic projection of an outer edge of the insulation layer on the partition substrate covers orthographic projection of the negative electrode membrane on the partition substrate;

a positive electrode plate of the first laminated electrode assembly is opposite to the negative electrode membrane of the partition plate, a negative electrode plate of the second laminated electrode assembly is opposite to the positive electrode membrane of the partition plate;

a positive tab and a negative tab of both the first laminated electrode assembly and the second laminated electrode assembly are extended out of the outer packaging; and the first laminated electrode assembly and the second laminated electrode assembly are connected in series through the positive tab and the negative tab.

2. The electrochemical apparatus according to claim 1, wherein a negative electrode membrane zone is present in a counterpart of a zone corresponding to the positive electrode membrane on an opposite side of the partition substrate; and a negative electrode membrane zone is present in at least a part of a counterpart of a zone corresponding to the insulation layer on the opposite side of the partition substrate.

3. The electrochemical apparatus according to claim 2, wherein an orthographic projection of a geometric center of the positive electrode membrane on the partition substrate coincides with orthographic projection of a geometric center of the negative electrode membrane on the partition substrate, a length in a radiating direction from the geometric center to an outer edge of the positive electrode membrane is L1; and in the same radiating direction, a length from the outer edge of the positive electrode membrane to the outer edge of the insulation layer is D, and a length from the geometric center to an outer edge of the negative electrode membrane is L2, wherein $$L1<L2 \text{ and } L1+D\geq L2.$$

4. The electrochemical apparatus according to claim 3, wherein the positive electrode membrane and the negative electrode membrane are rectangular; and $$Lx1<Lx2,\ Ly1<Ly2,$$

$$\frac{Lx1}{2}+Dx\geq\frac{Lx2}{2},\ \text{and}\ \frac{Ly1}{2}+Dy\geq\frac{Ly2}{2},$$

wherein, Lx1 is a length of the positive electrode membrane, Ly1 is a width of the positive electrode membrane, Lx2 is a length of the negative electrode membrane, Ly2 is a width of the negative electrode membrane, Dx is a width of an extension portion of the insulation layer relative to the positive electrode membrane in a long-side direction of the positive electrode membrane, and Dy is a width of an extension portion of the insulation layer relative to the positive electrode membrane in a short-side direction of the positive electrode membrane.

5. The electrochemical apparatus according to claim 1, wherein an electrical resistivity of the insulation layer is greater than $10^7$ Ω·m.

6. The electrochemical apparatus according to claim 3, wherein the partition plate satisfies at least one of the following characteristics:

(a) 0 mm≤L1+D−L2≤4.5 mm; or (b) 0.5 mm≤D≤5 mm.

7. The electrochemical apparatus according to claim 3, wherein the partition plate satisfies at least one of the following characteristics:

(a) an electrical resistivity of the insulation layer is greater than $10^{10}$ Ω·m;

(b) 1 mm≤L1+D−L2≤2.5 mm; or (c) 1.5 mm≤D≤3 mm.

8. The electrochemical apparatus according to claim 1, wherein the sealing layer is located at a periphery of the partition plate, and a distance between the insulation layer and the sealing layer is D3, wherein 0 mm≤D3≤20 mm.

9. The electrochemical apparatus according to claim 8, wherein 2 mm≤D3≤5 mm.

10. The electrochemical apparatus according to claim 1, wherein the insulation layer comprises ceramic particles, an average particle size of the ceramic particles is 10 nm to 20

μm, porosity of the insulation layer is 10% to 60%, and an average pore diameter of the insulation layer is 20 nm to 50 μm.

11. The electrochemical apparatus according to claim 10, wherein the insulation layer satisfies at least one of the following characteristics:

(a) the average particle size of the insulation ceramic particles is 100 nm to 10 μm;

(b) the porosity of the insulation layer is 20% to 40%; or (c) the average pore diameter of the insulation layer is 200 nm to 20 μm.

12. The electrochemical apparatus according to claim 1, wherein the partition plate satisfies at least one of the following characteristics:

(a) the insulation layer further comprises a binder and the binder accounts for 5% to 40% of the insulation layer by mass;

(b) the insulation layer comprises at least one of of $HfO_2$, $SrTiO_3$, $SnO_2$, $CeO_2$, MgO, NiO, CaO, BaO, ZnO, $ZrO_2$, $Y_2O_3$, $Al_2O_3$, $TiO_2$, $SiO_2$, boehmite, magnesium hydroxide, aluminum hydroxide, lithium phosphate, lithium titanium phosphate, lithium aluminum titanium phosphate, lithium lanthanum titanate, lithium germanium thiophosphate, lithium nitride, $SiS_2$ glass, $P_2S_5$ glass, $Li_2O$, LiF, LiOH, $Li_2CO_3$, $LiAlO_2$, lithium germanium phosphorous sulfur ceramics, or garnet ceramics.

13. The electrochemical apparatus according to claim 12, wherein the binder comprises at least one of polyamide, polyurethane, ethylene vinyl acetate copolymer, ethylene vinyl alcohol copolymer, polyacrylate, polyvinylidene fluoride, or polyvinylidene fluoride-hexafluoropropylene copolymer.

14. An electronic apparatus, comprising an electrochemical apparatus, wherein the electrochemical apparatus comprises a partition plate, a first laminated electrode assembly, a second laminated electrode assembly and an outer packaging; wherein the electrochemical apparatus further comprises a sealing layer, the partition plate extends through a sealing layer and is hermetically connected to the outer packaging to form a first sealed chamber and a second sealed chamber separated on two sides of the partition plate; the first sealed chamber contains the first laminated electrode assembly and a first electrolyte, and the second sealed chamber contains the second laminated electrode assembly and a second electrolyte; wherein the partition plate comprises a partition substrate, a positive electrode membrane, a negative electrode membrane; and an insulation layer, wherein, the positive electrode membrane and the negative electrode membrane are respectively located on two surfaces of the partition substrate;

the insulation layer is disposed on the partition substrate and the insulation layer is disposed at a periphery of the positive electrode membrane;

a zone surrounded by orthographic projection of an outer edge of the insulation layer on the partition substrate covers orthographic projection of the negative electrode membrane on the partition substrate;

a positive electrode plate of the first laminated electrode assembly is opposite to the negative electrode membrane of the partition plate, a negative electrode plate of the second laminated electrode assembly is opposite to the positive electrode membrane of the partition plate;

a positive tab and a negative tab of both the first laminated electrode assembly and the second laminated electrode assembly are extended out of the outer packaging; and the first laminated electrode assembly and the second laminated electrode assembly are connected in series through the positive tab and the negative tab.

* * * * *